(12) United States Patent
Bourlon (10) Patent No.: US 9,707,948 B2
(45) Date of Patent: Jul. 18, 2017

(54) ELECTROMECHANICAL ACTUATOR FOR A PARKING BRAKE, ELECTRIC MOTOR FOR SUCH AN ACTUATOR, AND ASSEMBLY METHODS

(71) Applicant: CHASSIS BRAKES INTERNATIONAL B.V., Amsterdam (NL)

(72) Inventor: Philippe Bourlon, Dammartin en Goele (FR)

(73) Assignee: CHASSIS BRAKES INTERNATIONAL B.V., Eindhoven (NL)

( * ) Notice: Subject to any disclaimer, the term of this patent is extended or adjusted under 35 U.S.C. 154(b) by 102 days.

(21) Appl. No.: 14/652,652

(22) PCT Filed: Dec. 4, 2013

(86) PCT No.: PCT/EP2013/075467
§ 371 (c)(1),
(2) Date: Jun. 16, 2015

(87) PCT Pub. No.: WO2014/095364
PCT Pub. Date: Jun. 26, 2014

(65) Prior Publication Data
US 2015/0323027 A1    Nov. 12, 2015

(30) Foreign Application Priority Data
Dec. 19, 2012  (FR) ...................................... 12 62292

(51) Int. Cl.
*B60L 7/00*         (2006.01)
*B60T 13/74*        (2006.01)
(Continued)

(52) U.S. Cl.
CPC ............ *B60T 13/741* (2013.01); *F16D 55/08* (2013.01); *F16D 55/225* (2013.01); *F16D 65/18* (2013.01);
(Continued)

(58) Field of Classification Search
CPC .................. F16D 65/18; F16D 55/225; F16D 2250/0084; F16D 55/08; B60T 13/741;
(Continued)

(56) References Cited

U.S. PATENT DOCUMENTS 7,021,415 B2    4/2006  Farmer et al.
8,790,208 B2 *  7/2014  Poertzgen ............. B60T 13/741
                                                        475/149
(Continued)

FOREIGN PATENT DOCUMENTS

EP    1 826 084 A1    8/2007
EP    1 975 447 A1   10/2008
(Continued)

OTHER PUBLICATIONS

International Search Report, dated Feb. 24, 2014, from corresponding PCT application.

*Primary Examiner* — Pamela Rodriguez
(74) *Attorney, Agent, or Firm* — Young & Thompson (57) ABSTRACT

An electromechanical actuator includes an actuator housing that contains an electric motor, a flexible printed circuit board placed on the motor and that includes an electrical connection part extending in a plane (PR), referred to as the connection plane, that is generally transverse to the axis of rotation of the shaft of the motor and that has at least two electrical connection holes, and an electrical connector including at least two internal conductive pins, each of which has a free rear electrical-connection end section, and in which, in the assembled position of the electric motor in (Continued)

the housing, each electrical connection section extends axially through a related connection hole of the electrical connection part wherein, before assembly of the motor in the housing, the electrical connection part extends in a plane (PM), referred to as the assembly plane, that forms an acute angle with the connection plane.

18 Claims, 11 Drawing Sheets

(51) Int. Cl.
| | | |
|---|---|---|
| *F16D 55/225* | (2006.01) | |
| *H02K 11/00* | (2016.01) | |
| *H02K 15/14* | (2006.01) | |
| *F16D 55/08* | (2006.01) | |
| *F16D 65/18* | (2006.01) | |

(52) U.S. Cl.
CPC ......... *H02K 11/0094* (2013.01); *H02K 15/14* (2013.01); *F16D 2250/0084* (2013.01); *Y10T 29/49011* (2015.01)

(58) Field of Classification Search
CPC ................ H02K 11/0094; H02K 15/14; Y10T 29/49011
USPC ........ 188/162, 156, 157; 74/606 R; 475/149, 475/150, 154
See application file for complete search history.

(56) References Cited

U.S. PATENT DOCUMENTS

| | | | |
|---|---|---|---|
| 9,410,590 B2 * | 8/2016 | Jang | ........................ H02K 7/116 |
| 2013/0180811 A1 | 7/2013 | Poertzgen et al. | |

FOREIGN PATENT DOCUMENTS

| | | |
|---|---|---|
| WO | 02/062604 A2 | 8/2002 |
| WO | 2009/016660 A1 | 2/2009 |
| WO | 2011/076366 A1 | 6/2011 |

* cited by examiner

ELECTROMECHANICAL ACTUATOR FOR A PARKING BRAKE, ELECTRIC MOTOR FOR SUCH AN ACTUATOR, AND ASSEMBLY METHODS

TECHNICAL FIELD OF THE INVENTION

The present invention relates to an electromechanical actuator for actuating a parking brake of a motor vehicle, which may also be used as an emergency brake, built into a hydraulically actuated disk brake.

The invention also relates to an electric motor of such an electromechanical actuator.

The invention also relates to a method for assembling such an electromechanical actuator and a brake including such an actuator.

PRIOR ART

The structure of a hydraulically controlled disk brake incorporating an electromechanical parking brake is known, in particular from documents U.S. Pat. No. 7,021,415 or WO-A1-2009/016660.

In a known manner, the brake includes a caliper able to bear and slidingly guide two opposing friction pads that are able to cooperate with a rotating disk.

Separate from the main hydraulic action of the disk brake, this latter includes electromechanical means for actuation and operation thereof as a parking brake or an emergency brake.

For this purpose, the brake includes a screw-nut unit that is arranged in the hydraulically actuated brake piston and an electrical gear motor unit referred to as an electromechanical actuator for driving the screw of the screw-nut unit in rotation in both directions.

Actuation of the parking brake using an electric motor belonging to this actuator enables a screwing torque to be applied to the screw of the screw-nut unit, said torque being converted by the screw-nut unit into an axial tightening thrust applied to the piston.

To produce such screwing torque, the actuator includes a reduction gear that is driven in rotation by the output shaft of the electric motor to drive in rotation an output member of the electromechanical actuator.

The electromechanical actuator includes an actuator housing that contains the components of the reduction gear and the electric motor.

To electrically connect the motor with the outside, and for example to power it electrically and control the operation thereof, the housing of the actuator includes an electrical connector with internal electrical pins designed to be connected to a power supply circuit of the motor, these conductive pins having, for this purpose, free rear electrical-connection end sections.

Furthermore, these pins include means for the electrical connection thereof with the outside.

The electrical connector may be added to or built into the housing, for example by overmolding the plastic of the housing around part of the conductive pins.

More specifically, there is a known design of such an electromechanical actuator that includes an electromechanical actuator for actuating a parking brake of a motor vehicle that includes:
  an actuator housing including an open rear face and in which the following are housed, at least partially:
  an electric motor including a rear fairing and a rotating shaft of which a rear axial extremity bears an output pinion arranged axially beyond a rear face of the fairing;
  a flexible printed circuit board placed on the fairing of the motor that includes an electrical connection part extending in a plane, referred to as the connection plane, that is generally transverse to the axis of rotation of the shaft of the motor and that has at least two electrical connection holes;
  and an electrical connector including at least two internal conductive pins, each of which has a conductive free rear electrical-connection end section,
  and in which:
  the motor is placed in a housing by inserting it axially from back to front via the open rear face of the housing;
  in the assembled position of the electric motor in the housing, each electrical connection section extends axially through a related connection hole of the electrical connection part and is connected electrically to a conductive track formed on the rear face of said electrical connection part.

On account of the design of the housing, the free rear electrical-connection end sections of the pins occupy a given position, in particular axially, in relation to the housing.

To enable the correct and reliable assembly of the electric motor in a seat of the housing receiving it in the assembled position, followed by an electrical connection operation by welding or brazing the conductive tracks to the connection sections, it is essential that assembly of the motor, by axial insertion from back to front of the body or housing of the motor into the seat thereof, guarantees, in particular for automated assembly, that each of these connection sections extends axially through the related connection hole.

The invention is intended to propose a design that guarantees such correct assembly of the electric motor with the electrical connector.

Another document EP-A1-1,975,447 describes and shows a conventional electromechanical braking device including conventional electrical connectors similar to the one identified in the preamble of claim 1.

SUMMARY OF THE INVENTION

For this purpose, the invention proposes an electromechanical actuator of the type mentioned above, characterized in that, before assembly of the motor in the housing, the electrical connection part extends in a plane, referred to as the assembly plane, that forms an acute angle with the connection plane.

According to other features of the actuator:
  the connection plane is orthogonal to the axis of rotation of the shaft of the motor, and the assembly plane is inclined axially backwards in relation to the connection plane;
  the flexible printed circuit board includes a part for attaching the flexible printed circuit board to the fairing that is prolonged by the electrical connection part;
  the attachment part extends in a plane parallel to the axis of rotation of the shaft of the motor;
  the fairing includes a seat that is delimited by an axial face to which the attachment part of the flexible printed circuit board is attached, and by a transverse face orthogonal to the axis of rotation of the shaft of the motor, against which the connection part of the flexible printed circuit board bears elastically to determine the assembly position;

the axial face of the seat includes a window that extends opposite the output pinion of the electric motor, and the attachment part of the flexible printed circuit board includes a rotation sensor for the pinion that is arranged opposite said window;

each of the two pins is fork-shaped with two free rear end sections and, when the electric motor is in assembled position in the housing, each of the four electrical connection sections extends axially through a related connection hole of the electrical connection part and is connected electrically to a related conductive track formed on the rear face of this electrical connection part of the flexible printed circuit board;

two of the conductive tracks are linked electrically to the rotation sensor;

the actuator includes a ring made of elastically deformable material that is assembled when axially compressed between a front transverse end face of the motor and a facing portion of the housing of the actuator;

each electrical connection section of a pin includes an axial stop that cooperates with a facing portion of a rear face of the electrical connection part.

The invention also proposes an electric motor for actuating a parking brake of a motor vehicle, that includes:

a rear fairing and a rotating shaft of which a rear axial extremity bears an output pinion arranged axially beyond the rear transverse face of the fairing;

a flexible printed circuit board placed on the fairing of the motor that includes an electrical connection part extending in a plane that is generally transverse to the axis of rotation of the shaft of the motor and that has at least two electrical connection holes each of which can be passed through axially by a free rear electrical-connection end section of an internal conductive pin, characterized in that the electrical connection part bears elastically against a facing portion of the fairing to extend in a plane, referred to as the assembly plane, which forms an acute angle with a plane orthogonal to the axis of rotation of the shaft of the motor, and the electrical connection part of the printed circuit board is elastically deformable from the assembly position to occupy a position, referred to as the electrical connection position, in which it extends in a plane orthogonal to the axis of rotation of the shaft of the motor.

The invention also proposes a method for assembling an electromechanical actuator for actuating a parking brake of a motor vehicle, that includes:

an actuator housing including an open rear face and in which the following are housed, at least partially:
  an electric motor including a rear fairing and a rotating shaft of which a rear axial extremity bears an output pinion arranged axially beyond the rear face;
  a flexible printed circuit board placed on the fairing of the motor, that includes an electrical connection part extending in a plane, referred to as the connection plane, that is generally transverse to the axis of the motor and that has at least two electrical connection holes, and that, before assembly of the motor in the housing, extends in a plane, referred to as the assembly plane, that forms an acute angle with said connection plane;
and an electrical connector including at least two conductive pins, each of which has a conductive free rear electrical-connection end section, characterized in that it includes the following steps:
making a housing including such an electrical connector;

placing such a motor in the housing by inserting it axially from back to front via the open rear face of the housing such that, in the assembled position of the electric motor in the housing, each electrical connection section extends axially through a related connection hole of the electrical connection part and is connected electrically to a conductive track formed on the rear face of said electrical connection part.

Finally, the invention proposes a method for assembling a motor-vehicle brake, characterized in that it includes the following steps:
making an electromechanical actuator according to the invention;
attaching an electromechanical actuator thus formed onto a rear face of a disk-brake caliper including an electromechanically actuated parking brake.

SHORT DESCRIPTION OF THE FIGURES

Other features and advantages of the invention are given in the detailed description below of an example embodiment of the invention, provided with reference to the attached drawings, in which.

DETAILED DESCRIPTION OF THE FIGURES

In the description below, identical or similar elements are identified using the same reference signs.

Figure 1:
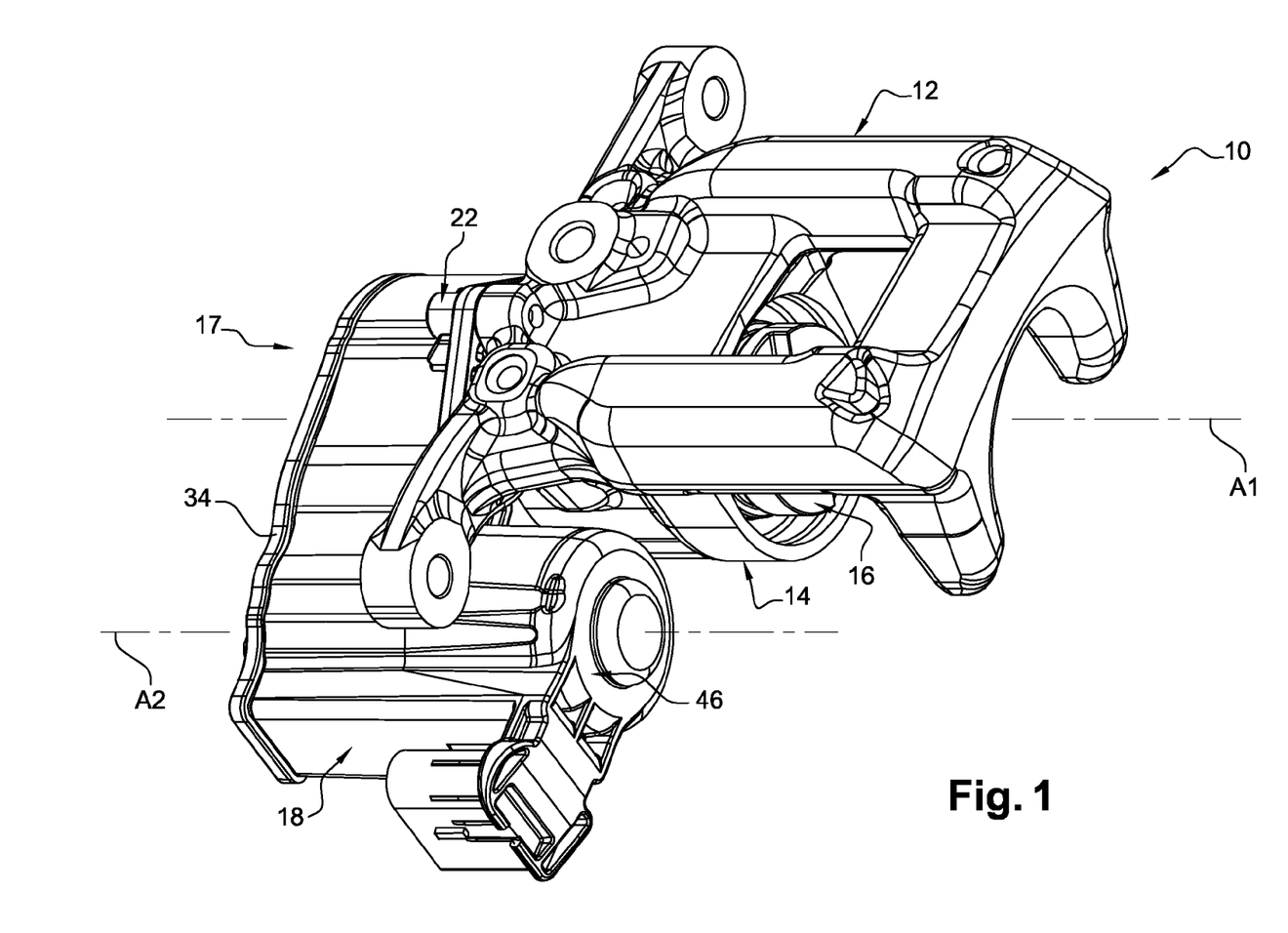
FIG. 1 is a general perspective view of a parking-brake disk brake including an electromechanical actuator according to the invention.
Figure 2:
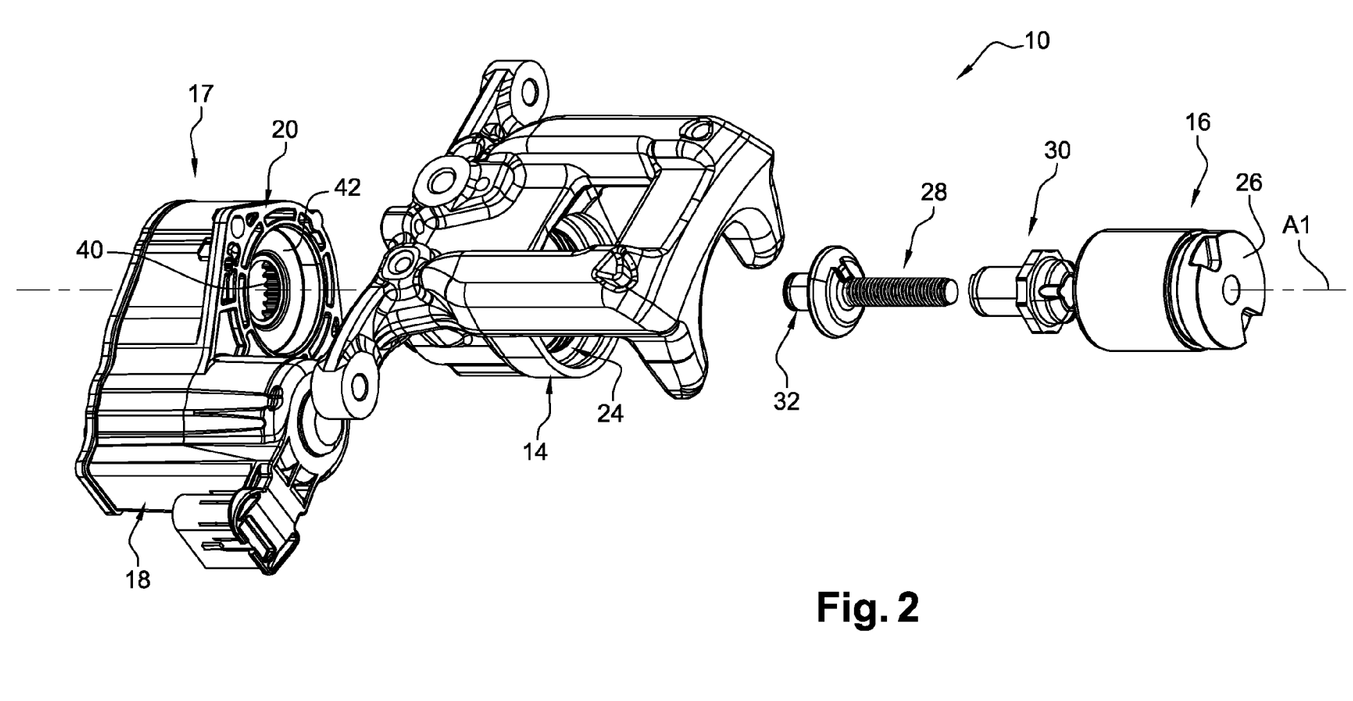
FIG. 2 is similar to FIG. 1, showing an exploded view of the main components of the brake in FIG. 1.

FIGS. 1 and 2 show a disk brake 10 without brake blocks or the means related to the axial sliding guidance and return of these blocks.

The disk brake essentially comprises a caliper 12 having a rear housing 14 in which a hydraulic brake piston 16 is mounted to axially slide from back to front, i.e. from left to right in FIG. 1 along an axis A1.

To the rear, the disk brake 10 includes a gear motor unit or electromechanical actuator 17, a housing 18 of which is shown here that, as explained in detail below, houses an electric motor and a planetary reduction gear.

The housing 18 is added and attached to a rear transverse face of the caliper 12 against which the housing 18 bears axially via the transverse face 20 thereof, the front extremity of which is open, the attachment being made in this case using screws 22.

The rear housing 14 of the caliper 12 delimits a hydraulic axial cavity 24 in which the piston 16 is mounted axially and slidingly, being sealed in both directions, along the axis A1.

The brake piston 16 is a part having an overall shape of a cylindrical pot opened axially at the rear and is able to cooperate, via the external front transverse face 26 thereof, with a related disk brake block (not shown).

The supply of pressurized hydraulic fluid from the chamber 24 triggers a hydraulic actuation of the brake by axial thrust towards the front of the piston 16 in relation to the rear housing 14 of the caliper 12.

For the mechanical actuation of the piston 16 in parking mode or in emergency-brake mode, the piston 16 and the chamber 24 house a screw-nut unit comprising a rear drive screw 28 and a front axial thrust nut 30.

To drive it in rotation in both directions, the screw 28 has a rear section 32 that, in assembled position, is accessible from the rear transverse face of the caliper 12 such as to form a rotational drive head of the screw 28 that is driven in rotation in both directions by a movement output member of the electromechanical actuator 17.

Figure 3A:
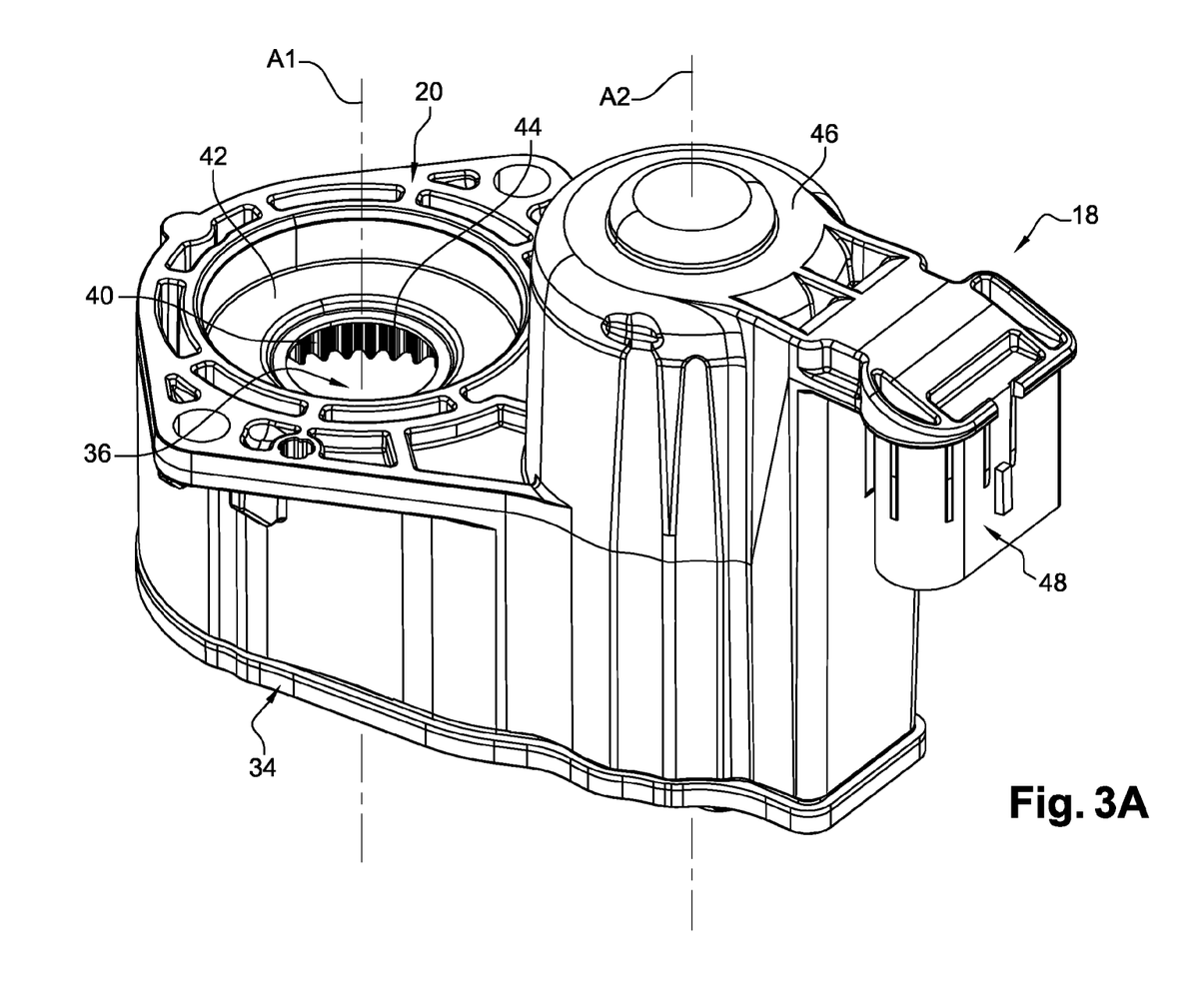
FIG. 3A is a large-scale perspective view of the housing of the electromechanical actuator shown in FIGS. 1 and 2.
Figure 3B:
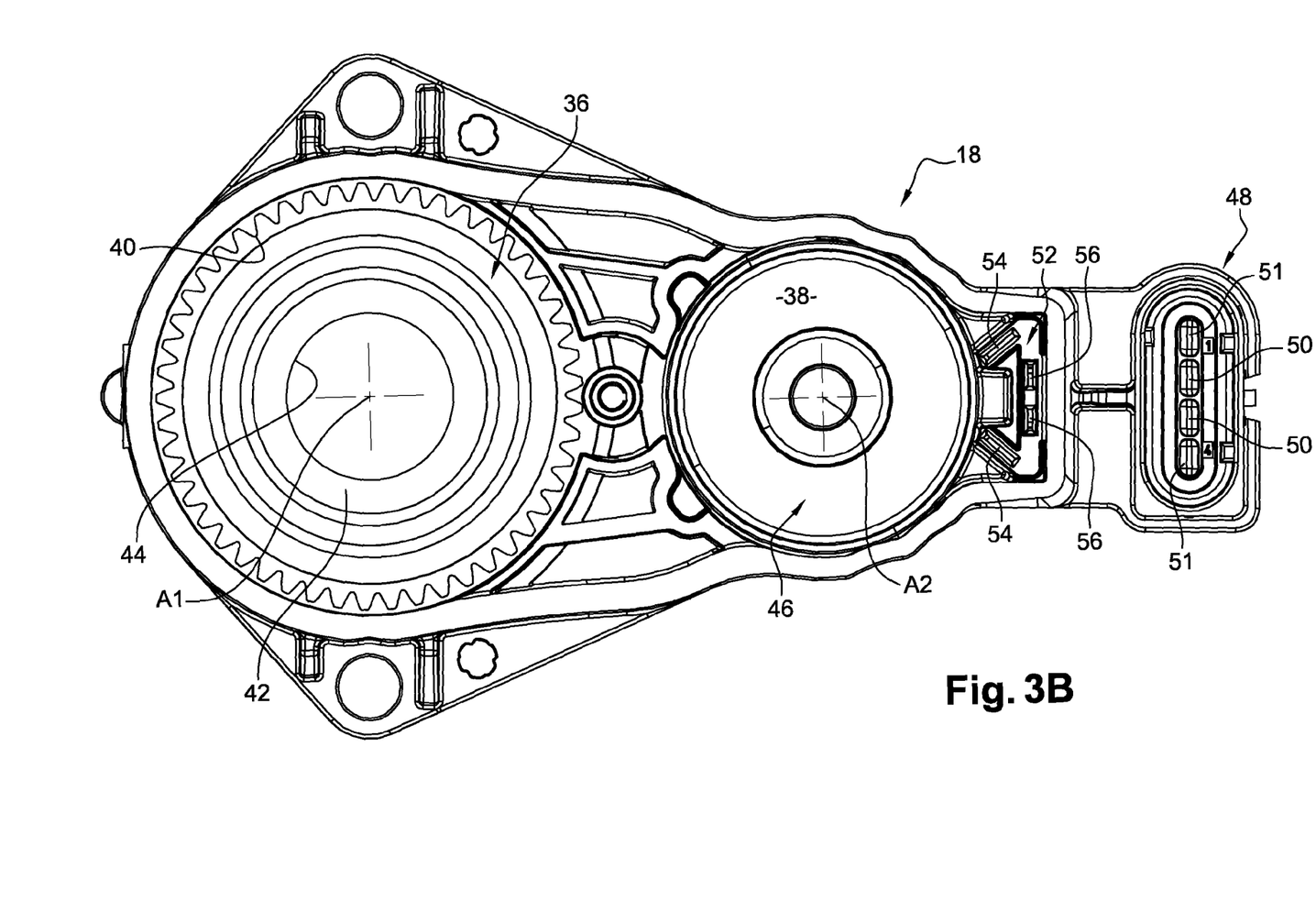
FIG. 3B is an axial end view of the housing in FIG. 3A shown without the closing cover or internal components thereof.

As shown in FIGS. 3A and 3B, the housing 18 is a plastic molded part that internally delimits two main seats, each having an overall cylindrical pot shape having parallel axes A1 and A2.

The rear face of the housing 18 is closed by a rear cover 34 added then welded or glued.

Before the cover 34 is put in place, the two seats 36 and 38 are open axially to the rear.

The first seat 36, to the left in FIGS. 3A and 3B, is designed to house a planetary gear (not shown) in which an internally toothed external sun gear 40 is in this case formed integrally by molding with the housing 18.

The first seat 36 is closed axially to the front by an annular back wall 42.

The annular back wall 42 has a central hole 44 to enable the passage of a movement-output member of the planetary gear.

The second seat 38, on the right-hand side in FIG. 3B, is also open axially to the rear and is designed to house an electric drive motor (not shown in FIG. 3B), an output pinion 86 of which is linked by gear means (not shown) to a sun gear of the planetary gear housed in the first seat 36.

The second seat 38 housing the electric motor is closed axially to the front by a back wall 46.

As shown in FIGS. 3A and 3B, the housing 18 of the actuator has, adjacent to the seat 38 and on the outside, a projecting part 48 that forms a housing for an external electrical connector for the electrical connection of the electromechanical actuator with the external circuits (not shown) of the motor vehicle for supplying electricity to the motor and controlling the operation thereof.

For this purpose, the part 48 is opened axially to the rear and includes two pairs of passages 50 and 51 that can receive the conductive electrical-connection terminals (not shown in FIG. 3B).

Equally, adjacent to the seat 38 able to receive the electric motor, the housing 18 includes an internal electrical connector 52 that has two pairs of passages 54 and 56 that are opened axially to the rear, each of which is able to receive a conductive section of a related connection pin (not shown in FIG. 3B).

Figures 4, 5:
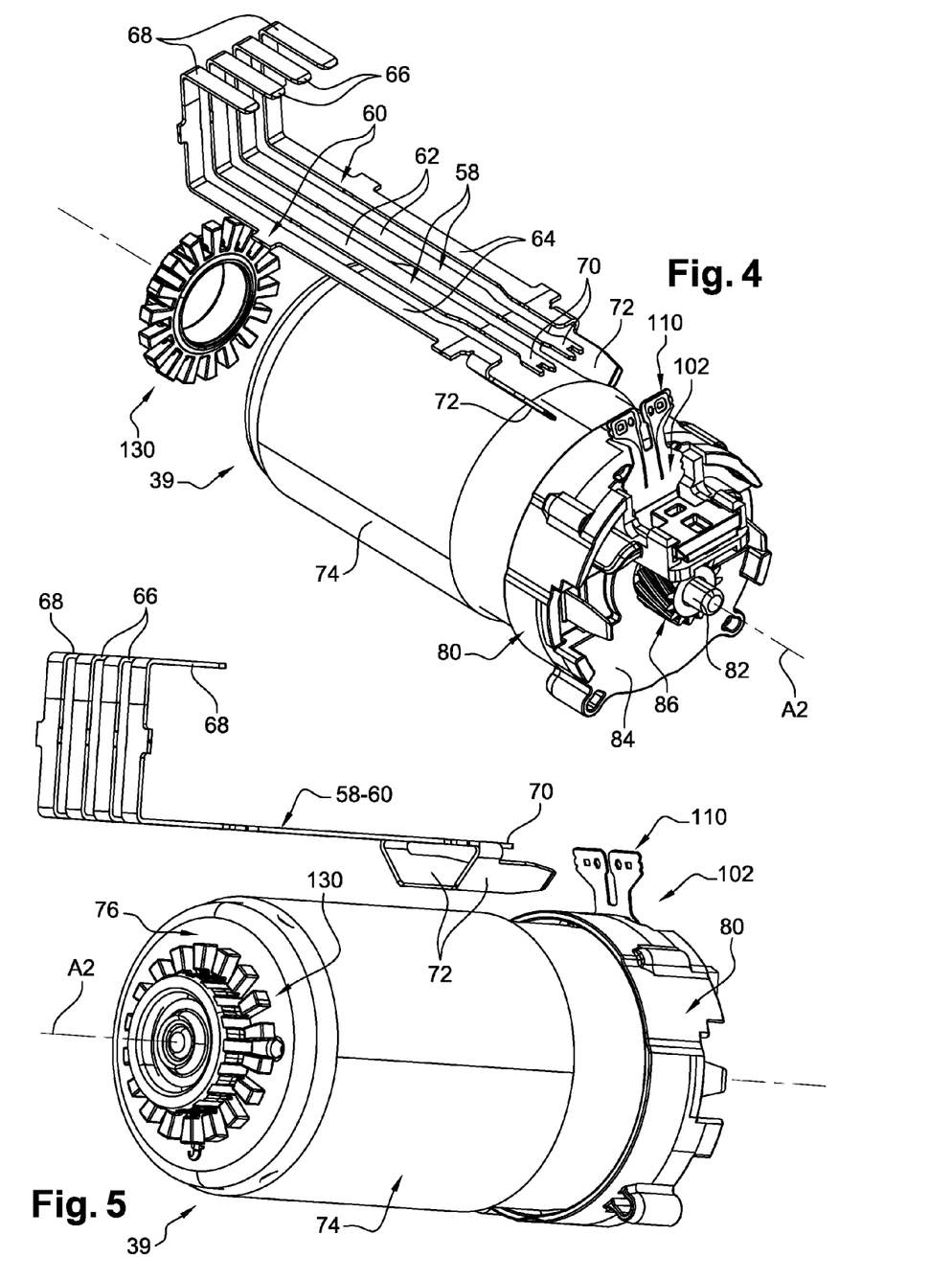
FIG. 4 is a perspective view of the electric motor of the electromechanical actuator with a series of electrical connection pins shown in a first axial position in relation to the motor, which is offset axially towards the rear in relation to the final assembled and electrically connected position.
FIG. 5 is a perspective view of the unit shown in FIG. 4, from another viewing angle.

FIGS. 4 and 5 in particular show the four conductive pins, made from metal by cutting and bending, and that, in the example embodiment shown in the figures, form metal inserts embedded in the plastic of the housing 18, which is formed by molding.

The group of four conductive pins includes a pair of central pins 58 and a pair of side pins 60.

Each of the four pins 58, 60 includes a main axial section 62 and 64 respectively.

Near to the front axial extremity thereof, each central section 62, 64 includes an L-shaped part ending in a conductive terminal 66, 68 respectively that extends axially backwards, the free end section thereof extending through a related passage 50, 51 respectively of the external connector 48.

Each central axial section 62, 64 extends axially backwards to a conductive free rear end section 70, 72 respectively.

Each conductive free rear end section 70, 72 extends axially through a related passage 56, 54 respectively of the internal electrical connector 52 to connect the electric motor 39.

The two electrical connection sections 72 of the two side pins 60 are used to supply electricity to the electric motor 39, while the two conductive sections 70 of the two central conductive pins 58 are designed to be connected to means of the electric motor 39 used to generate electrical signals, in particular representing the rotation of the shaft 81 of the motor 39.

The central axial sections 62 and 64 extend in the same axial plane parallel to the axis A2, as do the two free end sections 70 of the two central pins 58.

Figures 8, 9:
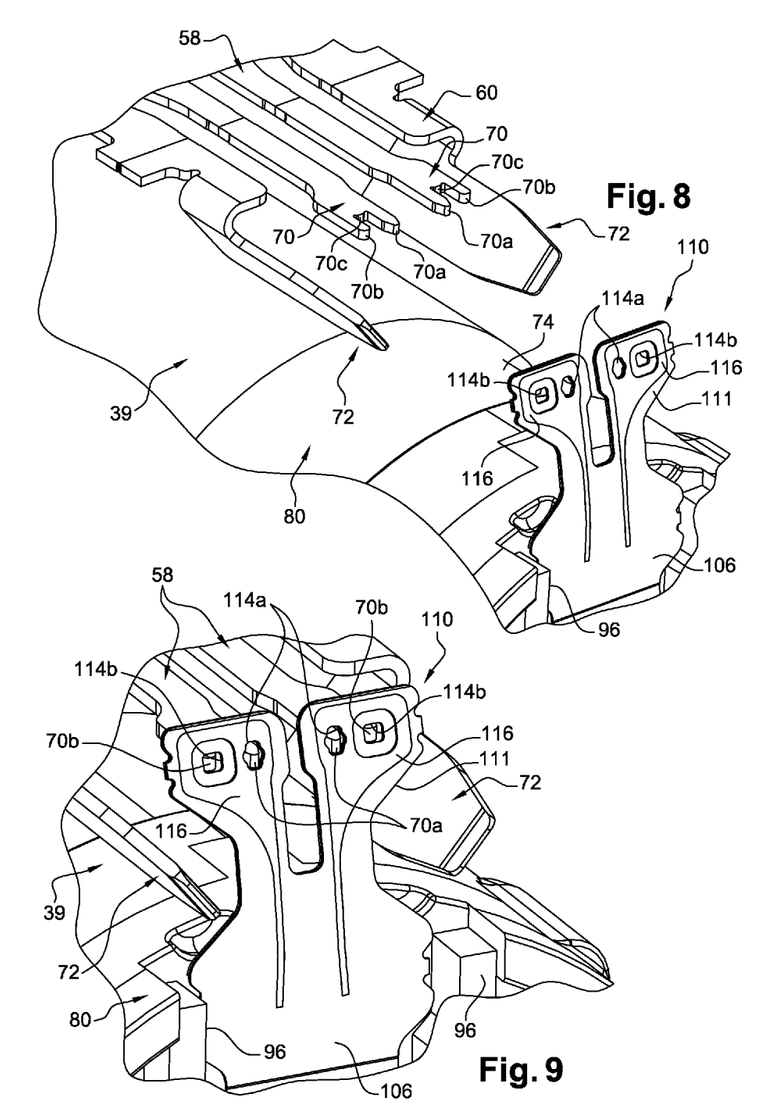
FIGS. 8 and 9 are large-scale, perspective detailed views showing the relative position of the electrical connection pins and of the electrical connection part of the flexible printed circuit board in the first and second axial positions shown in FIGS. 6 and 7.

As shown in detail, in particular in FIGS. 8 and 9, each extremity of a section 70 is in this case a U-shaped fork with two parallel axial teeth 70a and 70b.

Each fork-shaped end section 70 thus delimits a transverse back face 70c.

Figure 6:
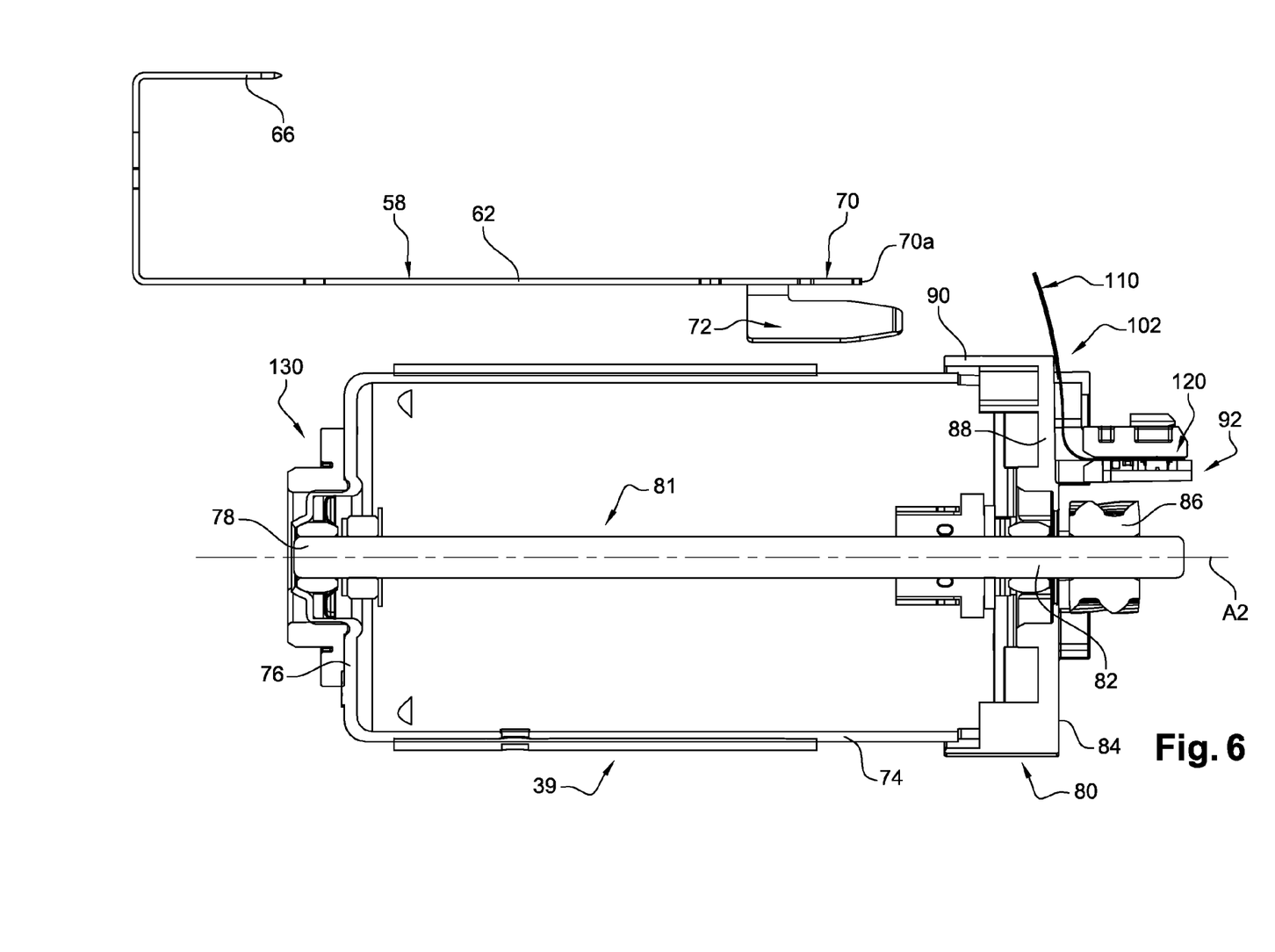
FIG. 6 is a cross section along an axial plane of the unit shown in FIG. 5.

The electric motor 30, the electromagnetic components of which are not shown in FIG. 6, essentially comprises a housing having a cylindrical side wall 74 closed at the front axial extremity thereof by a transverse wall 76 that delimits a seat in which a front end section 78 of the output shaft 81 of the rotor of the motor 39 is mounted in rotation about the axis A2.

The rear extremity of the cylindrical wall 74 of the housing 18 is closed axially by a rear fairing 80, which is a plastic molded part that delimits a seat in which is placed, in rotation about the axis A2, a free rear end section 82 of the shaft 81 which projects axially beyond a rear transverse face 84 of the fairing 80 and that bears an output pinion 86 connected in rotation to the output drive shaft 81 of the motor 39.

Figure 11:
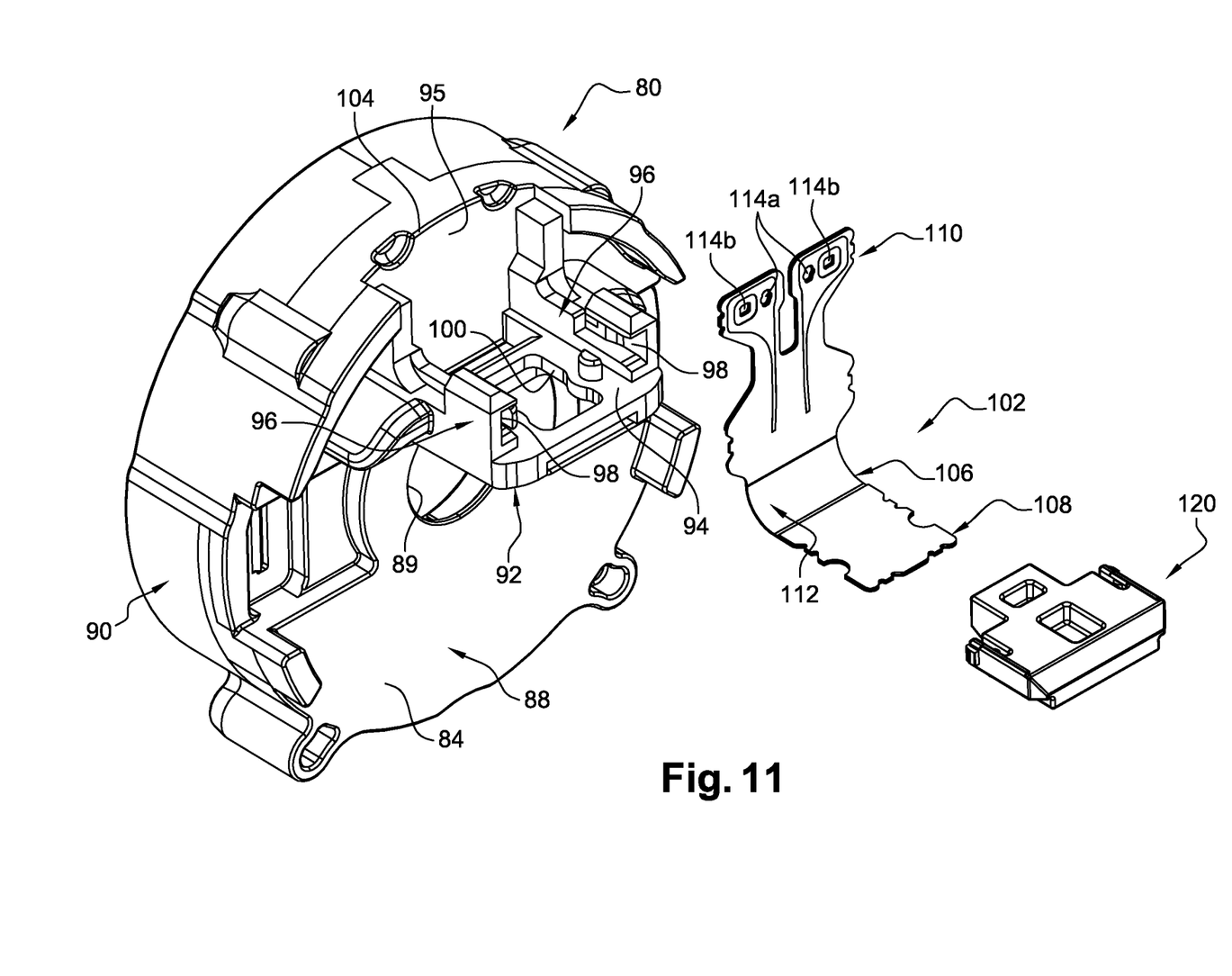
FIG. 11 is an exploded perspective view of the components of the rear fairing of the electric motor.

The fairing 80 of the housing of the motor 39 essentially comprises a radially oriented transverse wall 88 and a cylindrical side skirt 90.

The transverse wall 88 includes a central hole 89 to enable the axial passage of the section 82 of the shaft 81.

The fairing 80 includes a substantially plate-shaped axially oriented supporting element 92 formed integrally by molding with the fairing 80 and that extends axially rearwards from the face 84 of the transverse wall 88.

The supporting element 92 is delimited by a flat face 94 axially oriented outwards and that extends by means of two axially oriented opposing and parallel side faces 96 extending radially outwards.

Each side face 96 has an internal axial slot 98 that is open axially rearwards.

The plate-shaped supporting element 92 includes a central window 100 that extends opposite the output pinion 86 of the motor 39.

The supporting element 92, by means of the axial face 94 thereof and in cooperation with the portion 95 of the face 84 of the wall 88, delimits a seat open axially rearwards and radially outwards in which is positioned and attached a flexible printed circuit board 102.

The transverse back face 95 of the seat receiving the plate 102 is delimited radially outwards by a circular stop section 104.

Figure 12:
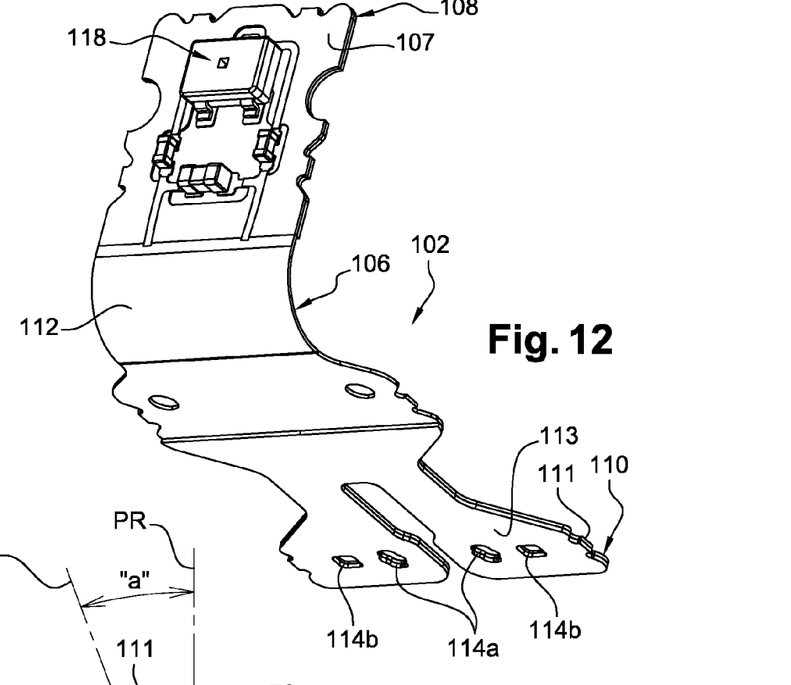
FIG. 12 is a larger scale perspective detailed view of the flexible printed circuit board shown in FIG. 11.

In a known manner, the flexible printed circuit board 102, commonly referred to as a "flex", essentially comprises an elastically deformable film made of synthetic material 106, the two opposing faces of which may include conductive tracks and bear electrical or electronic components.

The board 102 essentially comprises an axially oriented flat part 108 that is also the attachment part of the board on the fairing 80 of the motor 39, and a generally transversely oriented flat part 110 that is the electrical connection part of the plate 102 according to the invention.

The attachment part 108 and the connection part 110 are linked together by a central part 112 substantially bent to a right angle.

Close to the free radial extremity thereof, the electrical connection part 110 has two pairs of associated through-holes 114a and 114b through which a pair of associated teeth 70a, 70b of a conductive end section 70 of a central pin 58 can pass axially.

The two pairs of holes 114a and 114b are surrounded, on a rear face 111 of the connection part 110, by a conductive track 116 for the electrical connection, by brazing or soldering (not shown), of the teeth 70a and 70b of the pins 58 to the tracks 116, and with the electrical or electronic components on the printed circuit board 102.

These components are, as shown in particular in FIG. 12, arranged on a face 107 of the attachment part 108 and they include in particular a sensor 118 that is a Hall-effect sensor, which is positioned to project at least partially through the window 100 opposite the output pinion 86 of the motor 39 to form a rotation sensor of the pinion 86, and therefore of the shaft 81 of the motor 39.

The printed circuit board 102 is mounted in the complementary seat of the fairing 80 delimited by the faces 94 and 95 using the axially oriented attachment part 108 thereof, the face 107 thereof bearing against the face 94.

The lateral edges of the attachment part 108 have notches matching the shapes of the axial lateral edges of the face 94 to guarantee the precise geometric positioning of the attachment part 108.

Locking in position and attachment of the attachment part 108 are ensured by a locking key 120 that is fitted axially from back to front in the slots 98 of the supporting element 92 to clamp and lock the attachment part 108 in position, with the components on the face 107 thereof seated at least partially in the window 100.

Figure 10A:
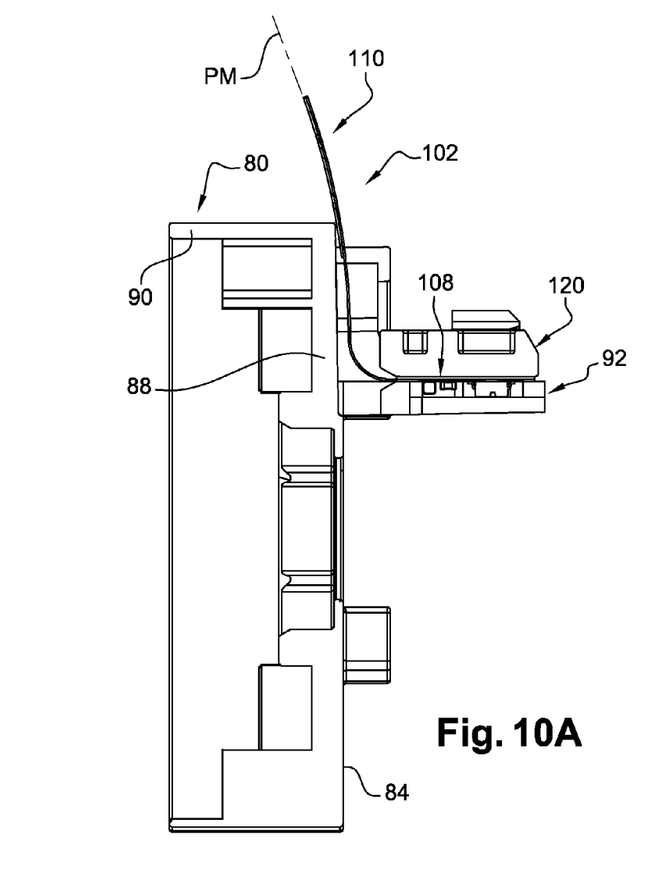
FIGS. 10A and 10B are cross sections along an axial plane of the rear fairing of the electric motor, on which the electrical connection part is shown in the assembly position thereof and in the connection position thereof, respectively.
Figure 10B:
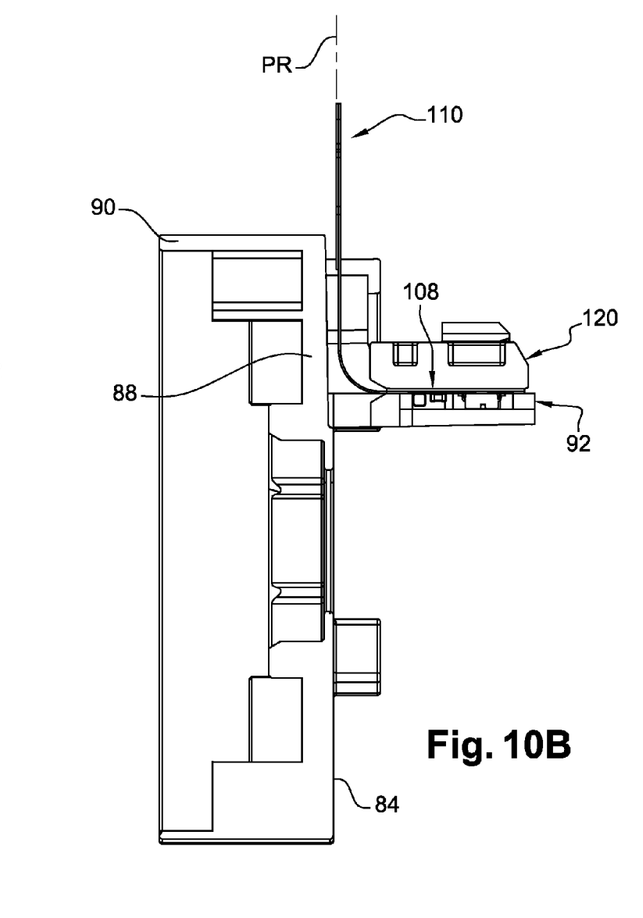

In this initial assembly position of the printed circuit board 102 on the fairing 80, i.e. before assembly of the motor 39 in the housing 18, and on account of the elasticity of the film 106 of the flexible board 102, the connection part 110 extends in a plane, referred to as the assembly plane PM, that, as shown in particular in FIGS. 8, 10A and 12, is inclined in relation to a transverse plane orthogonal to the axis A2.

This initial assembly position of the connection part 110 is in this case determined by a facing portion of a front face 113 of the connection part 110 bearing axially forwards against the circular stop section 104 of the fairing 80.

The assembly and attachment of the printed circuit board 102 described above ensure the precise geometric radial and transverse positioning of the connection part 110, and in particular the holes 114a and 114b.

Figure 13:
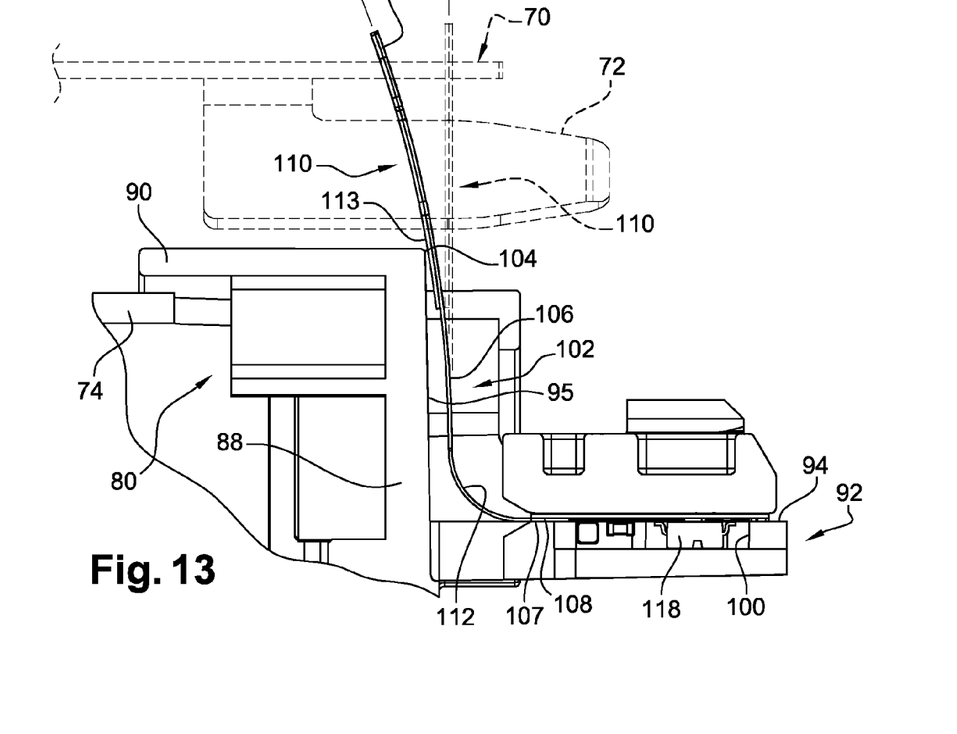
FIG. 13 is a larger scale detailed view of a part of the rear fairing of the motor, shown along an axial cross section as in FIGS. 10A and 10B, on which the electrical connection pins are shown as dotted lines in a third axial position in relation to the motor, which is the electrical connection position.

From this assembly position, the connection part 110 can be elastically deformed axially backwards, as shown in particular and precisely in FIG. 13, to occupy a position referred to as the electrical connection position in which the assembly part 110 extends radially outwards in a connection plane PR substantially orthogonal to the axis A2.

The description below relates to the assembly of the electric motor 39 in the seat thereof 38 of the housing 18 and the cooperation of the conductive sections 70 of the central pins 58 with the connection part 110 of the flexible printed circuit board 102.

The motor 39 is inserted axially, from back to front, in the seat 38 via the front part thereof by bringing the front transverse wall 76 thereof to bear axially against the lower facing portion of the back wall 46 of the seat 38.

In the design shown in the figures, an elastically deformable ring 130, made for example of an elastomer, is interposed between the transverse wall 76 and the wall 46.

The ring 130 is intended to dampen vibrations, and in particular noise, and also acts as an elastic shim, assembled when axially compressed, to take up the play for the axial assembly of the motor 39 in the seat 38 thereof of the housing 18, and is also used in the precise axial positioning of the motor 39, and therefore of the fairing 80 thereof, in relation to the housing 18, and therefore in relation to the conductive pins 58 and 60.

However, such a ring made of elastic material may be used independently of the electrical connection means of the motor according to the invention.

Figure 7:
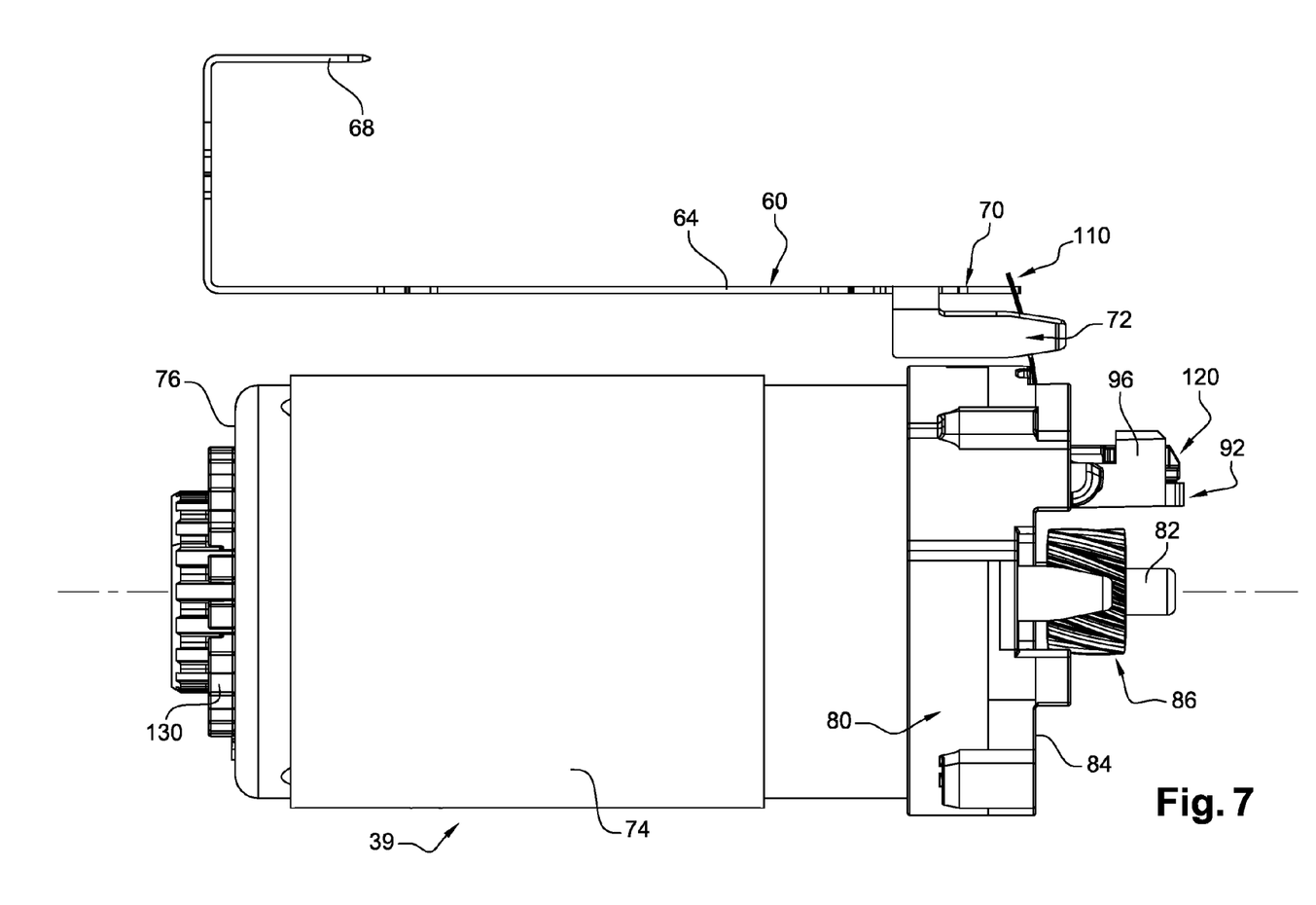
FIG. 7 is an external side view of the unit shown in FIG. 5, on which the series of electrical connection pins is shown in a second axial position, in relation to the motor, that is offset axially towards the rear in relation to the first axial position and that is offset axially towards the rear in relation to the final electrical connection position.

The axial insertion of the motor 39 in the seat 38 involves a relative axial movement of the connection part 110 of the board 102 in relation to the pins 58 and 70, and in particular a progressive axial approaching movement of these components, starting in particular from the first relative axial position shown in FIG. 6, passing through the second intermediate axial position shown in FIG. 7, and ending in the relative axial position shown using a dotted line in FIG. 13.

When the free rear end edges of the teeth 70a, 70b of the conductive sections 70 of the central pins 58 come into contact with the facing portion of the front face 113 of the connection part 110, the "return" of the part 110 is triggered, gradually reducing the value of the acute angle "a" formed by the assembly plane PM and the connection plane PR.

The free end edges of the teeth 70a cause this return until they are opposite the holes 114a that, on account of the angular movement of the connection part 110, complete a short trajectory radially outwards, ending up in the matching position shown in particular in FIGS. 7 and 9 in which the teeth 70a and 70b can axially penetrate the related holes 114a and 114b.

The teeth penetrate the holes until the stop surfaces formed by the bases 70c come into contact with the facing portions of the front face 113.

The relative axial movement continues until the components are in the connection position PR shown in particular in FIG. 13.

As described above, and in particular on account of the elasticity of the printed circuit board 102 and of the definition of the geometric positioning of the connection holes, and of the relative positioning of the motor 39 in relation to the connection pins 58, 60, when installing the motor 39 in the housing 18, a reliable and automatic insertion of the teeth 70a and 70b of the sections 70 of the central pins 58 in the related holes 114a and 114b of the printed circuit board 102 is achieved.

The assembly operations then continue by completing the actual electrical connection stages, in particular by brazing or soldering the track 116 to the teeth 70a and 70b and connecting the sections 72 of the lateral pins 60 to the connection plugs (not shown), then closing the housing 18 by crimping and/or gluing the rear cover 34 thereof.

The invention claimed is:

1. An electromechanical actuator (17) for actuating a parking brake of a motor vehicle, comprising:
   an actuator housing (18) including an open rear face and in which the following are housed, at least partially:
      an electric motor (39) that includes a rear fairing (80) and a rotatable shaft (81) of which a rear axial extremity (82) bears an output pinion (86) arranged axially beyond a rear transverse end face (84) of a rear extremity of the fairing (80) and
      a flexible printed circuit board (102) located on the fairing (80) of the motor, the flexible printed circuit board (102) including an electrical connection part (110) extending in a connection plane (PR) that is generally transverse to an axis of rotation (A2) of the shaft (81) of the motor and that has at least two electrical connection holes (114a, 114b); and
   an electrical connector including at least two internal conductive pins (58), each of which has a conductive free rear electrical-connection end section (70, 70a, 70b),
   wherein:
   the motor (39) is placed in the housing (18) by insertion axially from back to front via said open rear face,
   in an assembled position of the electric motor (39) in the housing (18), each electrical connection end section (70, 70a, 70b) extends axially through a related connection hole (114a, 114b) of the electrical connection part (110) and is connected electrically to a conductive track (116) formed on a rear face (111) of said electrical connection part, and
   before assembly of the motor (39) in the housing (18), said electrical connection part (110) extends in an assembly plane (PM), that forms an acute angle (a) with said connection plane (PR).

2. The actuator as claimed in claim 1, wherein said connection plane (PR) is orthogonal to the axis of rotation (A2) of the shaft (81) of the motor (39), and said assembly plane (PM) is inclined axially backwards in relation to the connection plane (PR).

3. The actuator as claimed in claim 2, wherein the flexible printed circuit board (102) includes a part (108) for attaching the flexible printed circuit board (102) to the fairing (80) that is prolonged by said electrical connection part (110).

4. The actuator as claimed in claim 3, wherein said attachment part (108) extends in a plane parallel to the axis of rotation (A2) of the shaft (81) of the motor (39).

5. The actuator as claimed in claim 4, wherein the fairing (80) includes a seat that is delimited by an axial face (94) to which the attachment part (108) of the flexible printed circuit board (102) is attached, and by a transverse face (95) orthogonal to the axis of rotation (A2) of the shaft (81) of the motor, against which the connection part (110) of the flexible printed circuit board (102) bears elastically to determine said assembly plane (PM).

6. The actuator as claimed in claim 5,
   wherein said axial face (94) of the seat includes a window (100) that extends opposite the output pinion (86) of the electric motor (39), and
   wherein the attachment part (108) of the flexible printed circuit board (102) includes a rotation sensor (118) for said pinion (86) that is arranged opposite said window (100).

7. The actuator as claimed in claim 1, wherein the flexible printed circuit board (102) includes an attachment part (108) for attaching the flexible printed circuit board (102) to the fairing (80) that is prolonged by said electrical connection part (110).

8. The actuator as claimed in claim 7, wherein said attachment part (108) extends in a plane parallel to the axis of rotation (A2) of the shaft (81) of the motor (39).

9. The actuator as claimed in claim 8, wherein the fairing (80) includes a seat that is delimited by an axial face (94) to which the attachment part (108) of the flexible printed circuit board (102) is attached, and by a transverse face (95) orthogonal to the axis of rotation (A2) of the shaft (81) of the motor, against which the connection part (110) of the flexible printed circuit board (102) bears elastically to determine said assembly plane (PM).

10. The actuator as claimed in claim 9, wherein said axial face (94) of the seat includes a window (100) that extends opposite the output pinion (86) of the electric motor (39), and the attachment part (108) of the flexible printed circuit board (102) includes a rotation sensor (118) for said pinion (86) that is arranged opposite said window (100).

11. The actuator as claimed in claim 10, wherein each of said two pins (58) is fork-shaped with two free rear end sections (70a, 70b) and, when the electric motor (39) is in an assembled position in the housing (38), each of the four electrical connection end sections (70a, 70b) extends axially through a related connection hole (114a, 114b) of the electrical connection part (110) and is connected electrically to a related conductive track (116) formed on the rear face (111) of said electrical connection part (110) of the flexible printed circuit board (102).

12. The actuator as claimed in claim 11, wherein two of said conductive tracks (116) are linked electrically to said rotation sensor (118).

13. The actuator as claimed in claim 1, further comprising:
   a ring (130) made of elastically deformable material that is assembled when axially compressed between a front transverse end wall (76) of the motor (39) and a facing wall (46) of the housing (18) of the actuator.

14. The actuator as claimed in claim 1, wherein each electrical connection end section of a pin (58) includes an axial stop (70c) that cooperates with a facing portion of a front face (113) of said electrical connection part (110).

15. A method for assembling a motor-vehicle brake, comprising the following steps:
   making an electromechanical actuator (17) as claimed in claim 1; and
   attaching the electromechanical actuator (17) thus formed onto a rear face of a caliper (12) of a disk-brake (10) including an electromechanically actuated parking brake.

16. The actuator as claimed in claim 1, wherein each of said two pins (58) is fork-shaped with two free rear end sections (70a, 70b), and when the electric motor (39) is in assembled position in the housing (38), each of the four electrical connection end sections (70a, 70b) extends axially through a related connection hole (114a, 114b) of the electrical connection part (110) and is connected electrically to a related conductive track (116) formed on the rear face (111) of said electrical connection part (110) of the flexible printed circuit board (102).

17. An electric motor (39) for actuating a parking brake of a motor vehicle, comprising:
   a rear fairing (80) and a rotating shaft (81) of which a rear axial extremity (82) bears an output pinion (86) arranged axially beyond a rear transverse face (84) of the fairing (80);
   a flexible printed circuit board (102) placed on the fairing (80) of the motor that includes an electrical connection part (110) extending in a plane that is generally transverse to an axis of rotation (A2) of the shaft of the motor and that has at least two electrical connection holes (114a, 114b), each of which can be passed through axially by a free rear electrical-connection end section (70a, 70b) of an internal conductive pin (58),
   wherein said electrical connection part (110) bears elastically against a facing portion (95) of the fairing (80) to extend in an assembly plane (PM), which forms an acute angle (a) with a plane orthogonal to the axis of rotation (A2) of the shaft (81) of the motor (39), and the electrical connection part (110) of the printed circuit board (102) is elastically deformable from an assembly position in which the printed circuit board (102) extends in the assembly plane (PM) to an electrical connection position in which the electrical connection part (110) extends in a plane (PR) orthogonal to said axis of rotation.

18. A method for assembling an electromechanical actuator for actuating a parking brake of a motor vehicle that includes an actuator housing (18) including an open rear face and in which an electric motor (39) and a flexible printed circuit board (102) are housed, the electric motor (39) including a rear fairing (80) and a rotating shaft (81) of which a rear axial extremity (82) bears an output pinion (86) arranged axially beyond a rear transverse face (84) of the fairing (80) and the flexible printed circuit board (102) placed on the fairing (80) of the motor that includes an electrical connection part (110) extending in a connection plane (PR) that is generally transverse to an axis of rotation (A2) of the shaft (81) of the motor (39) and that has at least two electrical connection holes (114a, 114b) and, before assembly of the motor (39) in the housing (18), extends in an assembly plane (PM) that forms an acute angle (a) with said connection plane (PR), and also including an electrical connector with at least two internal conductive pins (58), each of which has a free rear electrical-connection end section (70, 70a, 70b), the method comprising the following steps:
   making the housing (18) including said electrical connector;
   assembling said motor (39) in the housing (18) by inserting said motor (39) axially from back to front through said open rear face such that, in an assembled position of the electric motor in the housing (38), each electrical connection end section (70a, 70b) extending axially through a related connection hole (114a, 114b) of the electrical connection part (110) and connecting electrically to a conductive track (116) formed on a rear face (111) of said electrical connection part (110).

* * * * *